United States Patent
Hintz et al.

(10) Patent No.: US 10,691,115 B2
(45) Date of Patent: Jun. 23, 2020

(54) MACHINING SYSTEM AND METHOD, CONTROL DEVICE AND COMPUTER PROGRAM PRODUCT FOR CONTROLLING A MACHINING SYSTEM WITH A MACHINE TOOL

(71) Applicant: Siemens Aktiengesellschaft, München (DE)

(72) Inventors: Tobias Hintz, Lindenfels (DE); Alexander Pfaffinger, München (DE); Christian Royer, Ottobrunn (DE)

(73) Assignee: Siemens Aktiengesellschaft, München (DE)

( * ) Notice: Subject to any disclaimer, the term of this patent is extended or adjusted under 35 U.S.C. 154(b) by 195 days.

(21) Appl. No.: 15/566,081

(22) PCT Filed: Apr. 7, 2016

(86) PCT No.: PCT/EP2016/057558
§ 371 (c)(1),
(2) Date: Oct. 12, 2017

(87) PCT Pub. No.: WO2016/166001
PCT Pub. Date: Oct. 20, 2016

(65) Prior Publication Data
US 2018/0088562 A1    Mar. 29, 2018

(30) Foreign Application Priority Data

Apr. 15, 2015   (DE) .................. 10 2015 206 742
May 29, 2015   (DE) .................. 10 2015 209 924

(51) Int. Cl.
*G05B 19/418*   (2006.01)
*B23Q 3/155*   (2006.01)

(52) U.S. Cl.
CPC ..... *G05B 19/4187* (2013.01); *B23Q 3/15539* (2016.11); *B23Q 2003/15537* (2016.11);
(Continued)

(58) Field of Classification Search
CPC ...... G05B 19/4187; G05B 2219/32257; G05B 2219/50008; G05B 2219/50243;
(Continued)

(56) References Cited

U.S. PATENT DOCUMENTS 4,577,389 A    3/1986   Shultz
5,474,514 A    12/1995  Rutschle et al.
(Continued)

FOREIGN PATENT DOCUMENTS

CN    104128832 A    11/2014
DE    4304361 A1    8/1994
(Continued)

OTHER PUBLICATIONS

Avci S et al., "Tool Magazine Arrangement and operations sequencing on CNC machines", Nov. 1, 1996, European Journal of Engineering education, vol. 23, No. 11, pp. 1069-1081 (Year: 1996).*
(Continued)

*Primary Examiner* — Kenneth M Lo
*Assistant Examiner* — Istiaque Ahmed
(74) *Attorney, Agent, or Firm* — Schmeiser, Olsen & Watts LLP

(57) ABSTRACT

A machine tool including a first and a second tool magazine, wherein a tool for machining a workpiece can be received from the first tool magazine and a tool from the second tool magazine can be transferred into the first tool magazine, and wherein one of the tools includes a multiple tool that can be fitted with a plurality of tools prior to the machining. A method for controlling a machine tool includes the steps of detecting workpieces to be machined, determining the tools
(Continued)

required for machining the detected workpieces and determining the tools, with which the multiple tool is to be fitted.

8 Claims, 1 Drawing Sheet

(52) U.S. Cl.
CPC ............ *G05B 2219/32257* (2013.01); *G05B 2219/50008* (2013.01); *G05B 2219/50243* (2013.01); *Y02P 90/205* (2015.11); *Y10T 483/10* (2015.01); *Y10T 483/12* (2015.01); *Y10T 483/1731* (2015.01); *Y10T 483/1855* (2015.01)

(58) Field of Classification Search
CPC ...... B23Q 3/15539; B23Q 2003/15537; Y10T 483/10; Y10T 483/12; Y10T 483/1731; Y10T 483/1855; Y02P 90/205
See application file for complete search history.

(56) References Cited

U.S. PATENT DOCUMENTS

| | | | |
|---|---|---|---|
| 2014/0121084 A1 | 5/2014 | Klinkhammer et al. |
| 2014/0323279 A1 | 10/2014 | Miyamoto |
| 2014/0342889 A1 | 11/2014 | Kraft et al. |
| 2015/0248128 A1 | 9/2015 | Davis et al. |

FOREIGN PATENT DOCUMENTS

| | | |
|---|---|---|
| DE | 102012111230 A1 | 5/2014 |
| EP | 2724797 A1 | 4/2014 |

OTHER PUBLICATIONS

No author, "Punching at a Glance", Mar. 13, 2015, TRUMPF, pp. 11-13,18,21,34-35 (Date provided by the ISR using Wayback Machine) (Year: 2015).*
Han et al, "Real-time tool control and job dispatching in flexible manufacturing systems", 1989, Int. J. Prod. Res., vol. 27, No. 8, p. 1259. (Year: 1989).*
Song et al, "Heuristic Algorithm for the Tool Movement Policy in Flexible Manufacturing System", 1995, Journal of Manufacturing Systems, vol. 14/No. 3, p. 162 (Year: 1995).*
Kohlhase, Matthias: "Flexible Machining of Large Castings"; in: Industrial and Production Engineering, Carl Hanser Verlag, Munchen, DE; vol. 14; No. 1; pp. 36-40; XP000179531; ISSN: 0343-334X;; 1999.
Akturk, M. Selim et al.: "Joint lot sizing and tool management in a CNC environment"; in: Computers in Industry, Elsevier Science Publishers, Amsterdam, NL; vol. 40; No. 1; pp. 61-75; XP004178451; ISSN: 0166-3615; DOI:10.1016/S0166-3615(98)00143-2;; 1999.
Anonym: "Automatisierunq von Stanz- und Stanz-Laser-Maschinen"; in: Trumpf GmbH & Co. KG; XP002759541; Gefunden im Internet: URL:http://web.archive.org/web/20150313150312/http://www.at.trumpf.com/de/produkte/werkzeugmaschinen/produkte/stanzen/automatisierung.html.
Granger, C. :"Software Strategies for Cell Management"; in: Machinery and Production Engineering, Machinery Publishing Co.Ltd. Burgess Hill, GB; vol. 148; No. 3789; pp. 32/33,35; XP000151253; ISSN: 0024-919X.
Avci, Selcuk et al.: "Tool Magazine Arrangement and Operations Sequencing on CNC Machines"; in: European Journal of Engineering Education; vol. 23; No. 11; pp. 1069-1081; XP000609207.
Anonym:"Stanztechnoloqie kompakt"; in: Trumpf GmbH & Co. KG; XP002759540; Gefunden im Internet: URL:http://www.at.trumpf.com/de/produkte/werkzeugmaschinen/produkte/stanzen/automatisierung.html.
International Search Report for PCT application No. PCT/EP2016/057558, dated Oct. 24, 2016.

* cited by examiner

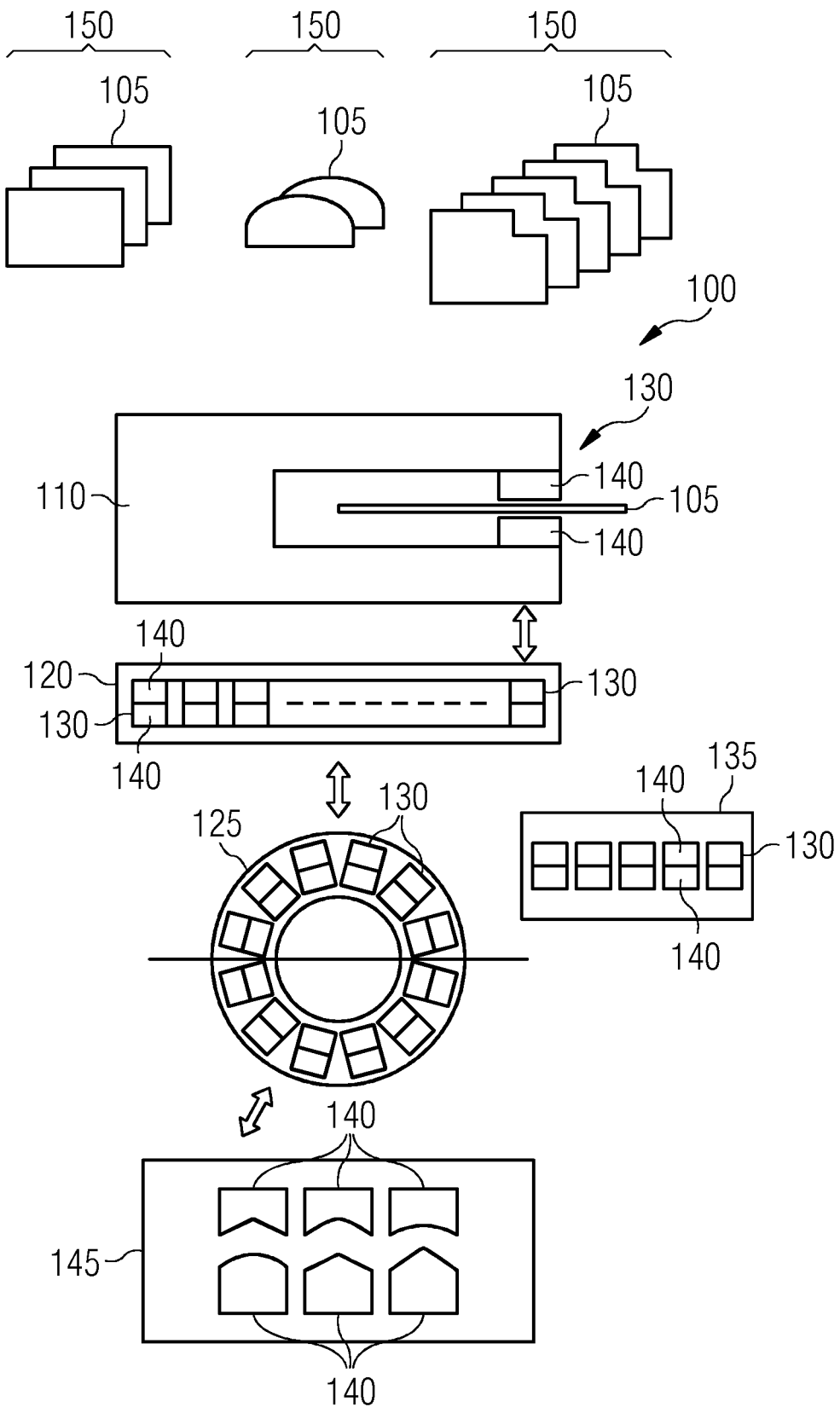

MACHINING SYSTEM AND METHOD, CONTROL DEVICE AND COMPUTER PROGRAM PRODUCT FOR CONTROLLING A MACHINING SYSTEM WITH A MACHINE TOOL

CROSS-REFERENCE TO RELATED APPLICATIONS

This application claims priority to PCT Application No. PCT/EP2016/057558, having a filing date of Apr. 7, 2017, based off of German Application No. DE 102015206742.4 having a filing date of Apr. 15, 2015 and German Application No. 102015209924.5, having a filing date of May 29, 2015 the entire contents of which are hereby incorporated by reference.

FIELD OF TECHNOLOGY

The following relates to a method, a computer program product, a device, and a system for controlling a machine tool.

BACKGROUND

A machine tool is set up to machine a workpiece using different tools one after the other. In particular, the machine tool can comprise a punching machine which machines a flat workpiece, such as a metal sheet. For this purpose, the machine tool can comprise a tool magazine with spaces for storing a predetermined number of tools. The machine tool can pick up one of the tools from the tool magazine and use it to carry out one or more machining steps on the workpiece.

A so-called multi-tool can also be provided, which from the point of view of the tool magazine is treated as a standard tool, but which can be equipped with, for example, up to five or up to ten separate tools, which are then available for machining the workpieces.

In addition, two staggered tool magazines can be provided, wherein the machine tool can access a tool from the first tool magazine relatively quickly. If a tool is to be used that is not located in the first tool magazine, then this can be transferred from the second tool magazine into the first. At the same time, another tool can be replaced from the first to the second tool magazine. Such an access takes a relatively long time, however, for example approximately 20-30 seconds, and this usually has to be carried out not only when machining a single workpiece, but also when machining each workpiece of a job consisting of similar workpieces. Through the use of multi-tools, the capacity of the first tool magazine can be increased so that less frequent tool changes between the first and the second tool magazine may be required.

SUMMARY

A machine tool comprises a first and a second tool magazine, wherein a tool for machining a workpiece can be collected from the first tool magazine and a tool can be transferred from the second tool magazine into the first tool magazine, and wherein one of the tools comprises a multi-tool, which can be equipped with a plurality of tools prior to the machining. A method for controlling a machine tool comprises steps of identifying workpieces to be machined, determining tools that are required for machining the identified workpieces, and determining tools with which the multi-tool is to be fitted. The tools are determined in such a way that the weighted sum $1*LC+w*TP$ is minimized over all workpieces to be machined, where LC is the number of the tools that are transferred from the second into the first tool magazine for machining the workpiece, TP is the number of the tools which are to be fitted in one of the tool magazines for machining the workpiece, and l and w represent predetermined weighting factors.

Using the defined criterion, the tools to be used for the multi-tool can be simply and reliably determined. This can involve using a mathematical optimization procedure, for example, wherein the said criterion can be simply and reliably expressed and formed in the optimization procedure. The tools for the multi-tools are preferably formed using mixed integer programming (MIP) methods.

The above sum can also be formed with equal weighting factors l and w, and in particular both weighting factors can be one, so that in practice an unweighted sum is used. In another embodiment, one of the two weighting factors is zero, so that optimization is only performed according to the other criterion. There can also be a plurality of multi-tools provided, whose tools can be determined as specified. Holding capacities of the multi-tools for tools can be the same or different. A further factor that can be taken into account is which of the tools may be used in which multi-tool. The optimization criterion in this case can remain unchanged. The specific assignment of tools to multi-tools can thus be implemented on the machine tool in an improved way.

The determination can also comprise an assignment of tools or multi-tools to the tool magazines. After determination, the tools are usually fitted in the multi-tools and/or the tool magazines before workpieces are machined by means of the machine tool. The machining can also be controlled by the method.

In one variant the possibility exists of fitting two or more identical tools on different multi-tools. In this case the machining of a workpiece is controlled in such a way that only one of the identical tools is used at a time. Each operation on the same workpiece with one of the identical tools is then carried out with the same tool. This means that in some circumstances, additional tool changes can be saved.

In another variant, it is assumed that a tool may be fitted on no more than one multi-tool. If a tool of a multi-tool is usable for a workpiece, then this multi-tool is preferably also used for it.

In both variants, a quantity of multi-tools with already fitted tools can be considered. In the first variant, the use of existing multi-tools can be prohibited for types of workpieces, for which they are currently not being used. The result achieved by this is that tools from new multi-tools are not used unnecessarily, and the number of production programs that must be changed can be kept low.

A a computer program product (non-transitory computer readable storage medium having instructions, which when executed by a processor, perform actions) comprises program code means for carrying out the method described above when it is running on an execution device or is stored on a computer-readable medium.

A control device for the above-described machine tool is configured to carry out the steps of the above-described method.

A machining system comprises the above-described machine tool and the above-described control device.

BRIEF DESCRIPTION

Some of the embodiments will be described in detail; with reference to the following figures, wherien like desigantions denote like members, wherein:

FIG. 1 shows a machining system with a machine tool, in accordance with embodiments of the present invention.

DETAILED DESCRIPTION

FIG. 1 shows a machining system 100 for machining workpieces 105. The machining system 100 comprises a machine tool 110 with a control device 115. The machine tool can include in particular a punching machine, for example a Trumatic 5000 or Trumatic 7000.

The machine tool 110 comprises a first tool magazine 120 (linear magazine) and optionally a second tool magazine 125 (round magazine, Toolmaster), each for holding a predetermined number of tools 130. If the machine tool 110 is a Trumatic 5000, for example, then the holding capacity of the first tool magazine 120 is currently 21 and that of the second tool magazine 125 is 50 tools 130. In the case of the Trumatic 7000 the first tool magazine 120 currently holds 25 and the second tool magazine 125 holds 70 tools 130.

The machine tool 110 is configured to machine a workpiece 105 by means of one or more tools 130, which it can collect automatically from the first tool magazine 120 one after another. Such a tool change proceeds relatively quickly, usually taking an estimated approx. 1-10 seconds. From the second tool magazine 125, a tool 130 can be transferred into the first tool magazine 120, wherein a different tool 130 is usually replaced from the first tool magazine 120 to the second 125. This process typically takes considerably longer, for example approximately 20-30 seconds, and is also called a linear magazine change.

If a workpiece 105 is to be machined which requires more tools 130 than can be held in the first tool magazine 120, such a change is necessary. If a number of identical workpieces 105 are machined one after the other, then this exchange—and where appropriate, a corresponding replacement—must be carried out for each individual workpiece 105.

The second tool magazine 125 can be configured to be retrofitted or refitted with tools 130 during the machining of a workpiece 105 using the machine tool 110, wherein individual tools 130 from the second tool magazine 125 can be removed or added. The second tool magazine 125 can be organized in a circular manner, for example, wherein in a first circle segment a retrofitting or refitting can be performed, and in a second circle segment different from the first, an exchange of tools 130 with the first tool magazine 120 can take place.

To reduce the number of spaces provided for tools 130 in the tool magazines 120, 125, multi-tools 135 can be provided, each of which only occupies the space of a single tool 130 in the tool magazines 120, 125, but in turn can accommodate a plurality of tools 130. The storage capacity of the multi-tools 135 is in this case limited, for example, multi-tools 135 can be provided for a maximum of five or a maximum of ten tools 130.

Because of their dimensions, it is often the case that not all tools 130 are suitable for being accommodated in a multi-tool 135. The usability of a tool 130 in a multi-tool 135 can be based on the packing density of tools 130 in the multi-tool 135, so that a tool 130 that can be fitted in a 10-way multi-tool 135 can usually also be fitted in a 5-way multi-tool 135, but possibly not vice versa.

Some of the tools 130 can also be composed of two or more parts 140. For example, for a punching, embossing or deep drawing process, one part 140 can comprise a die and another part 140 can comprise a stamp. For a predefined machining operation on a workpiece 105, the required tool 130 can require different parts 140, for example, depending on the material thickness of the workpiece 105, to ensure a predetermined clearance. The clearance depends on the distance between the parts 140 of the tool 130, in which the workpiece 105 is located when being machined. A tool 130 can also be used for a range of parameters, for example for workpieces 105 with a material thickness of approximately 0.8 to 1.5 mm. Depending on the material or any other parameter of the workpiece 105, different parts 140 can also be required to form a suitable tool 130.

The individual parts 140 can be kept in an inventory 145, which is implemented as a storage system, for example. If ready assembled tools 130 are also held in the inventory 145, when equipping the tool magazines 120, 125 with tools 130, only a part of them need to be installed in advance.

To fit a tool 130 in one of the tool magazines 120, 125 or in a multi-tool 135, all the parts 140 required for it must usually be determined and obtained from the inventory 145; then the parts 140 must be joined to the tool 130, which is generally performed manually. Usually, when fitting a tool 130, another one must also be removed to free up space in the tool magazine 120, 125 or the multi-tool 135. A removed tool 130 is usually disassembled back into its parts 140 and the parts 140 are moved back into the inventory 145. The removal can also be understood as a part of the tool fitting. The entire process is also known as tool preparation or single-tool preparation, and can take place in a dedicated pre-fitting area, which is usually further away from the machine tool 110 than the second tool magazine 125. The provision of a tool 130 from parts 140 of the inventory 145 is time-consuming and labor-intensive. The process of providing a tool normally takes several minutes to several tens of minutes.

The machine tool 110 is usually not only used to machine individual workpieces 105, but jobs 150, wherein a batch of identical workpieces 105 which are machined in the same way, i.e. using the same tools 130, is assigned to each job 150. For producing a single workpiece 105, the number of units for the associated job 150 can also be equal to one. Workpieces 105 of a job 150 are usually machined one after the other, without the number of fitted tools 130 being changed.

Jobs 150, or workpieces 105, that can be machined using the machine tool 110 without a change in the tools 130 fitted in the tool magazines 120, 125, can be termed a setup group 155. The quantity of the tools 130 fitted in this way is also called a tool set 160.

For machining workpieces 105, a conveyor unit (not shown) can be provided, which feeds unmachined workpieces 105 into the machine tool 110 automatically one after another and/or removes machined workpieces 105. The machine tool 110 can thus be operated unattended for fairly long periods.

The idea underlying embodiments of the invention is to select the tools 130 that are fitted in a multi-tool 135 in such a way that the machine tool 110 can be operated as efficiently as possible and fitting or refitting operations of the tool magazines 120, 125 are minimized as far as possible. To this end, a particular aim is to assign the tools 130 to multi-tools 135 using the methods of integer-based or Mixed Integer Programming (MIP).

Embodiments of the invention will now be explained in more detail in a mathematical way.

(I) Labels

In the following MIP formulations, the following terms are used.

Indices

C quantity of workpieces 105 to be machined on the machine tool 110

T quantity of all tool stamps 140

$T_C$ quantity of tool stamps 140 which are required for the workpieces 105 of type c MT quantity of multi-tools 135 (both embossing and punching multi-tools 135) to be newly assembled $MT_C$ quantity of new multi-tools 135 which can be used for a workpiece 105 of type c (punching multi-tools 135 can only be used with material thicknesses of the workpiece 105 of between 0.8 and 1.5 mm, while embossing multi-tools 135 can be used for all material thicknesses)

$T_{mt}$ quantity of tool stamps 140 that may be used in multi-tool 130 mt (e.g., punching tools 130 may only be used in punching multi-tools 135 and embossing tools 130 only in embossing multi-tools 135)

S possible clearance values $S_c$ possible clearance values for workpieces 105 of type c Parameters $nBoards_c$ number of workpieces 105 of type c to be manufactured $nSetup_c$ number of refittings of workpieces 105 of type c linCap capacity of the linear magazine 120 of the given machine tool 110

$nTools_{mt}$ number of tools 130 which can be accommodated in multi-tool 130 mt $W_{Lin}$ weighting of the objective "Maximize savings in linear magazine changes"

$W_{Prep}$ weighting of the objective "Maximize savings in tool preparation costs"

Binary Variables $Assign_{t,s,mt}$ variable indicating whether a tool stamp 140 t with the clearance s can be fitted on the multi-tool 135 mt. (In this case, it takes the value 1, otherwise the value 0)

$IsUsed_{c,mt}$ variable indicating whether the multi-tool 135 mt is used for workpieces 105 of type c. (In this case, it takes the value 1, otherwise the value 0)

$Process_{c,t,mt}$ variable indicating whether the punching operations, which must be performed for workpiece 105 c with tool stamp 140 t, are made by multi-tool 135 mt. (In this case, it takes the value 1, otherwise the value 0)

Additional Auxiliary Variables $NToolMTs_c$ number of individual tools 130 in the multi-tools 135, which are used for a workpiece 105 of type c $SavedTools_C$ number of physical tools 130 required for the production of workpieces 105 of type c, which have been saved $NLinChanges_c$ number of linear magazine changes used in the machining of workpieces of type c $NToolPreps_c$ number of tool preparations for the machining of workpieces of type c (II.) IP Formulation for the Model with Unique Tool Stamp Assignments In this model a maximum of one tool stamp 140 may be fitted on one multi-tool 135. If a tool 130 of a multi-tool 135 is usable for a workpiece 105, then this multi-tool 135 is also used for it.

$$\text{minimize} \sum_{c \in C} (w_{Lin} NLinChanges_c + w_{Prep} NToolPreps_c)$$

s.t.:

(1) $\sum_k \sum_T \sum_{<S} Assign_{t,s,mt} < nTools_m mt \in MT$ (2) $\sum_k \sum_T \sum_{<S} Assign_{t,s,mt} \leq nTools_{mt} IsUsed_{c,mt} c \in C, mt \in MT_C$ (3) $\sum_{m \in MT} \sum_{s \in S} Assign_{t,s,mt} \leq 1 t \in T$ (4) $NToolsInMTs_C = \sum_{m \in MT} \sum_{WT} \sum_{s \in S} Assign_{t,s,mt} c \in C$ (5) $SavedTools_n = NToolsInMTs_C - \sum_{m \in MT_n} IsUsed_{c,mt} c \in C$ (6) $NLinChanges_C \geq nBoards_C (|T_c| - SavedTools_C - linCap) c \in C$ (7) $NToolPreps_C = nSetup_C (|T_c| - NToolsInMts_C) c \in C$ (8) $Assign_{t,s,mt} = 0$ $mt \in MT, s \in S, t \in T \setminus T_{mt}$ (9) $IsUsed_{c,mt} = 0$ $c \in C, mt \in MT \setminus MT_C$ $Assign_{t,s,mt} \in \{0, 1\}$ $t \in T, s \in S, mt \in MT$ $IsUsed_{c,mt} \in \{0, 1\}$ $c \in C, mt \in MT$ $NToolsInMTs_C \geq 0$ $c \in C$ $SavedTools_C \geq 0$ $c \in C$ $NLinChanges_C \geq 0$ $c \in C$ $NToolPreps_C \geq 0$ $c \in C$ Explanations:

For (1): No more than the specified number of individual tools 130 may be installed on a multi-tool 135 mt. Usually there are 5 or 10 individual tools 130, depending on the type of multi-tool 135.

For (2): If a tool stamp 140 t is fitted on a multi-tool 135 mt, then the multi-tool 135 is used for each possible workpiece 105 in terms of clearance that requires this tool stamp 140.

For (3): A tool stamp 140 must be fitted on no more than one multi-tool 135.

For (4): Per workpiece 105, or type of workpiece 105, the number of the tools 130 used in the multitools 135 is the sum of all tools 130 fitted in the multi-tools 135 with matching stamp 140 and matching clearance.

For (5): Per workpiece 105, or type of workpiece 105, the saving of the tools 130 required corresponds to the number of usable individual tools 130 fitted in the multi-tools 135 (tool stamp 140 with permissible clearance) minus the number of multi-tools 135 used.

For (6): If the number of tool stamps 140 ($=|T_C|$-Saved$Tools_c$) required for a workpiece 105 or type of workpiece 105 is less than or equal to the capacity of the linear magazine 120, then there is no linear magazine change. In the other case, the number of linear magazine changes is the difference in the number of required tool stamps 140 and the capacity of the linear magazine 120, multiplied by the number of units of the workpiece 105 to be manufactured.

For (7): Per workpiece 105 the number of individual tool preparations corresponds to the number of required tool stamps 140 which are not fitted in the multi-tools 135, multiplied by the number of refittings of the workpiece 105. This latter number can correspond to the number of workpieces 105 in a job 150 that are to be machined.

For (8): Tool stamps 140 may only be fitted onto multi-tools 135 that are permissible for them. Examples: stamping tools 130 may only be fitted on stamping multi-tools 135. On 10-way multi-tools 135, only tool stamps 140 permitted for 10-way multi-tools may be fitted.

For (9): Multi-tools 135 may only be used for workpieces 105 for which they are also permissible (cf. the definition of $MT_c$)

(III.) IP formulation of the model in which one tool stamp may be fitted on a plurality of multi-tools In this model it is possible to fit two identical tools 130 onto two different multi-tools 135. This means that in some circumstances, additional linear magazine changes can be saved.

If there is a usable tool 130 for a workpiece 105 on a multi-tool, then one of the multi-tools 135 is definitely used. It must also be determined with which multi-tool 135 such a workpiece 105 is used. Therefore, the $Process_{c,t,mt}$ variables are also required.

$$\text{minimize} \sum_{c \in C} (w_{Lin} NLinChanges_c + w_{Prep} NToolPres_c)$$

s.t.:

$$(1) \sum_{MT} \sum_{s \in S} Assign_{t,s,mt} \leq nTools_{mt} mt \in MT$$

$$(2) \sum_{wE_2} Assign_{t,s,mt} \geq Process_{c,t,mt} c \in C, t \in T_4, mt \in MT_c$$

$$(3) \sum_{WT_c} Process_{c,t,mt} \leq |T_c| IsUsed_{c,mt}$$

$$c \in C, mt \in MT_c$$

$$(4) \sum_{m \in S, MT} Process_{c,t,mt} \leq 1$$

$$c \in C, t \in T_n$$

$$(5)\ NToolsInMTs_c = \sum_{m \in S, MT_c} \sum_{MT_A} Process_{c,t,mt} c \in C$$

$$(6)\ SavedTools_c \geq NToolsInMTs_c - \sum_{m \in S, MT_c} IsUsed_{c,mt} c \in C$$

$$(7)\ NLinChagess_c \geq nBoards_n(|T_c| - SavedTools_c - linCap)c \in C$$

$$(8)\ NToolPreps_c = nSetup_c(|T_b| - NToolsInMTs_c)c \in C$$

$$(9)\ Assign_{t,s,mt} = 0$$

$$mt \in MT, s \in S, t \in T \setminus T_{mt}$$

$$(10)\ IsUsed_{c,mt} = 0$$

$$c \in C, mt \in MT \setminus MT_c$$

$$(11)\ Process_{c,t,mt} = 0$$

$$c \in C, mt \in MT \setminus MT_c, t \in T_c T_{mt},$$

$$c \in C, mt \in MT_c, t \in T_c \setminus T_m,$$

$$Assign_{t,s,mt} \in \{0, 1\}$$

$$t \in T, s \in S, mt \in MT$$

$$IsUsed_{c,mt} \in \{0, 1\}$$

$$c \in C, mt \in MT$$

$$Process_{c,t,mt} \in \{0, 1\}$$

$$c \in C, t \in T_n, mt \in MT$$

$$NToolsInMTs_c \geq 0$$

$$c \in C$$

$$SavedTools_c \geq 0$$

$$c \in C$$

$$NLinChanges_c \geq 0$$

$$c \in C$$

$$NPreps_c \geq 0$$

$$c \in C$$

Explanations:

For (1): On a multi-tool 135 mt only a limited number of tools 130 can be fitted, which is usually 5 or 10 tools 130, depending on the type of the multi-tool 135.

For (2): For a tool stamp 140 t required for workpieces 105 of type c, only one multitool 135 mt may be used, on which a tool 130 is fitted with this stamp 140 and with a permissible clearance.

For (3): A multitool 135 mt is used for workpieces 105 of type c if at least one tool 130 of the multi-tool 135 is used for the type of workpieces 105.

For (4): The operations on workpieces 105 of type c that must be performed with the tool stamp 140 t may not be used by more than one multi-tool 105.

For (5): Per type of workpiece 105, the number of the tools 130 used in the multi-tools 135 is the sum of all tools 130 fitted in the multi-tools 135 with matching stamp 140 and matching clearance.

For (6): Per type of workpiece 105, the saving of the tools 130 required corresponds to the number of individual tools 130 fitted in and used for the multi-tools 135 (tool stamp 140 with permissible clearance) minus the number of multi-tools 135 used.

For (7): If the number of the tool stamps 140 ($=|T_c|-SavedTools_c$) required for a type of workpieces 105 is less than or equal to the capacity of the linear magazine 120, then there is no linear magazine change. In the other case, the number of linear magazine changes is the difference in the number of required tool stamps 140 and the capacity of the linear magazine 120, multiplied by the number of units of the type of workpieces 105 to be manufactured.

For (8): Per type of workpieces 105 the number of individual tool preparations corresponds to the number of required tool stamps 140 which are not fitted in the multi-tools 135, multiplied by the number of fittings of the type of workpieces 105.

For (9): No impermissible tool stamps 140 may be fitted on the multi-tools 135. Examples: stamping tool stamps 140 may only be fitted on stamping multi-tools 135. On 10-way multi-tools 135, only tool stamps 140 permitted for 10-way multi-tools 135 may be fitted.

For (10): Multi-tools 135 must not be used for types of workpieces 105 for which they are impermissible (cf. the definition of $MT_c$)

For (11): Punching operations which must be performed for a workpiece 105 c with tool 130 t cannot be performed by multi-tool 135 mt if the tool 130 is not permitted on the multi-tool 135 mt, or if multi-tool 135 mt is not permitted for workpiece 105 c in principle.

(IV.) 3.2 Extension: Consideration of Existing Multi-Tools

An application case found in practice is also that a configured multi-tool 135 is already present and furthermore, one or a plurality of additional new multi-tools 135 are to be configured. Both preceding models (cf. II and III) can be adapted to also be able to handle this case.

If tool stamps 140 are not fitted on the existing multi-tools 135 multiple times and if the intention is not to change the use of the current multi-tools 135, i.e. they will continue to be used for the types of workpieces 105 for which they are currently being used, then the model of section 3.2 may be extended as follows:

The quantity of multi-tools 135 now consists of the quantity of the already existing multi-tools 135 and the new multi-tools 135.

The configurations of the already existing multi-tools 135 already exist. The variables $Assign_{t,s,mt}$ for these multi-tools 135 must be set to the corresponding values in additional constraints.

In the model of section III., in which one tool stamp 140 may be fitted on a plurality of multi-tools 135, existing multi-tools 135 can also be taken into account. If one wants to allow tool stamps 140 which are fitted in existing multi-tools 135 on new multi-tools 135 also, then the model must be adapted as follows:

The quantity of multi-tools 135 now consists of the quantity of the already existing multi-tools 135 and the new multi-tools 135.

The configurations of the already configured multi-tools 135 already exist. The variables $Assign_{t,s,mt}$ for these multi-tools 135 must be set to the corresponding values in additional constraints.

If desired, the use of tool stamps 140 of existing multi-tools 135 can be prohibited for types of workpieces 105, for which they are currently not used. The corresponding $Process_{c,t,mt}$ variables must then be set to 0.

Using the following additional target function component the current multi-tools 135 are used in preference ($w_{small}$ is in this case a small positive real number):

$$-w_{small} \sum_{c \in C} \sum_{mt \in MT_{aht}} \sum_{t \in T_c} Process_{c,t,mt}$$

Therefore tools 130 from new multi-tools 135 are not used unnecessarily and the number of the required changes to production programs is kept low.

Without this target function component it could also happen that for workpieces 105 in which old multi-tools 135 were previously used, no multi-tools 135 are used any longer at all. If, for example, the minimization of the linear magazine changes were the only target function, then for workpieces that require fewer tools 130 than there is available capacity in the linear magazine 120, the previously used old multi-tools 135 would no longer be used either.

Although the invention has been illustrated and described in greater detail by means of the preferred exemplary embodiment, the invention is not restricted by the examples disclosed and other variations can be derived therefrom by the person skilled in the art without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for controlling a machine tool with a first tool magazine and a second tool magazine; wherein a tool for machining a workpiece can be collected from the first tool magazine and a tool can be transferred from the second tool magazine into the first tool magazine, and wherein one of the tools comprises a multi-tool, which is equipped with a plurality of tools prior to the machining, the method:

identifying a plurality of workpieces to be machined;
determining the tools that are required for machining the identified plurality of workpieces; and
determining the tools with which the multi-tool is to be fitted;
wherein the tools are determined in such a way that a weighted sum l*LC+TP is minimized over the plurality of workpieces to be machined;
wherein LC is a number of the tools that are transferred from the second tool magazine into the first tool magazine for machining the workpiece;
wherein TP is a number of the tools which are to be fitted in one of the first magazine and the second tool magazine for machining the workpiece;
wherein l and w are predetermined weighting factors.

2. The method as claimed in claim 1, further machining the identified plurality of workpieces by means of the machine tool.

3. The method as claimed in claim 2; wherein a plurality of multi-tools is provided; a plurality of identical tools can be fitted on different multi-tools and the machining of the workpiece which is to be machined with one of the identical tools is performed with only one of the identical tools.

4. The method as claimed in claim 1, wherein a plurality of multi-tools is provided and no two identical tools are fitted in different multi-tools.

5. The method as claimed in claim 1; wherein the tools for the multi-tools are formed using mixed integer programming methods.

6. The method as claimed in claim 1, wherein a quantity of multi-tools with already fitted tools is taken into account.

7. A control device for a machine tool having a tool magazine for tools, of which the machine tool can collect one at a time for machining a workpiece, wherein the control device is configured to carry out the steps of the method of claim 1.

8. A machining system, comprising a machine tool having a tool magazine for tools, of which the machine tool can collect one at a time for machining a workpiece, and a control mechanism as claimed in claim 7.

* * * * *

UNITED STATES PATENT AND TRADEMARK OFFICE
CERTIFICATE OF CORRECTION

PATENT NO. : 10,691,115 B2
APPLICATION NO. : 15/566081
DATED : June 23, 2020
INVENTOR(S) : Tobias Hintz et al.

It is certified that error appears in the above-identified patent and that said Letters Patent is hereby corrected as shown below:

In the Claims

Column 10, Line 36, delete "sum1 *LC+TP" and insert -- sum 1 * LC + w * TP --

Signed and Sealed this
Eleventh Day of August, 2020

Andrei Iancu
*Director of the United States Patent and Trademark Office*